United States Patent [19] [11] 4,272,047
Botka [45] Jun. 9, 1981

[54] ADJUSTABLE CLAMP
[75] Inventor: Leslie M. Botka, Bellevue, Wash.
[73] Assignee: Boeing Commercial Airplane Company, Seattle, Wash.
[21] Appl. No.: 861,802
[22] Filed: Dec. 19, 1977

Related U.S. Application Data

[63] Continuation-in-part of Ser. No. 781,373, Mar. 25, 1977, abandoned.

[51] Int. Cl.² .............................................. F16L 3/08
[52] U.S. Cl. ............................................. 248/74 PB
[58] Field of Search ................. 24/16 PB; 248/74 PB

[56] References Cited
U.S. PATENT DOCUMENTS

| | | | |
|---|---|---|---|
| 3,054,585 | 9/1962 | Roberts | 24/16 PB |
| 3,339,246 | 9/1967 | Geisinger | 24/16 PB |
| 3,542,321 | 11/1970 | Kahabka | 24/16 PB |
| 3,581,347 | 6/1971 | Verspieren | 24/16 PB |
| 3,584,525 | 6/1971 | Caveney | 24/16 PB |
| 3,761,999 | 10/1973 | Morgan | 24/16 PB |
| 3,816,878 | 6/1974 | Fulton | 24/16 PB |
| 3,908,233 | 9/1975 | Caveney | 24/16 PB |
| 3,973,292 | 8/1976 | Bonnet | 24/16 PB |

FOREIGN PATENT DOCUMENTS

| | | | |
|---|---|---|---|
| 968131 | 5/1975 | Canada | 24/16 PB |
| 2360992 | 7/1974 | Fed. Rep. of Germany | 24/16 PB |
| 2528724 | 2/1976 | Fed. Rep. of Germany | 24/16 PB |

Primary Examiner—William H. Schultz
Attorney, Agent, or Firm—Morris A. Case; Bernard A. Donahue

[57] ABSTRACT

A support clamp for wire or hydraulic bundles has a flexible strap for binding the bundles. The strap has lateral teeth along one side, one end of the strap is integral with a head and the other end of the strap goes around the bundle and enters an opening that extends through the head. A member integral with the head is resiliently pivotable, extends into the head opening, and has lateral teeth. The member is pivoted as the strap is inserted, the teeth engage, and hold the strap tight against the bundles to prevent loosening of the strap unless a handle on the member is actuated.

13 Claims, 16 Drawing Figures

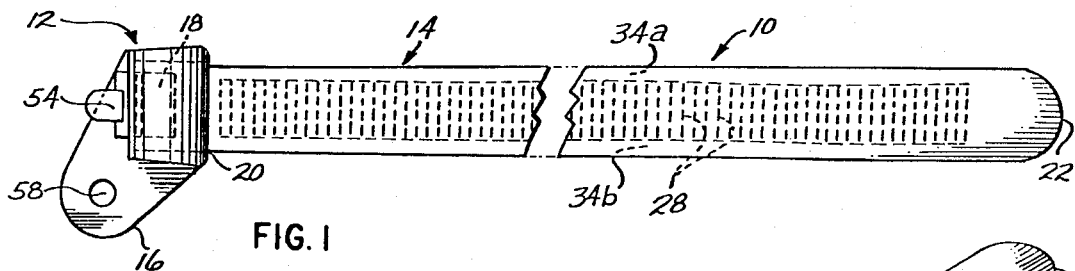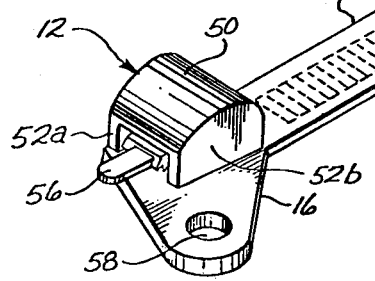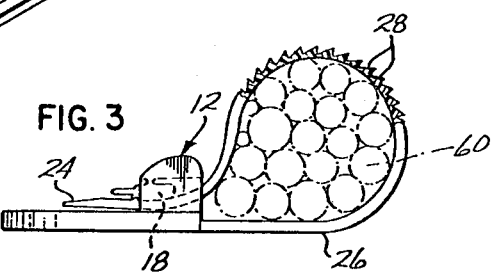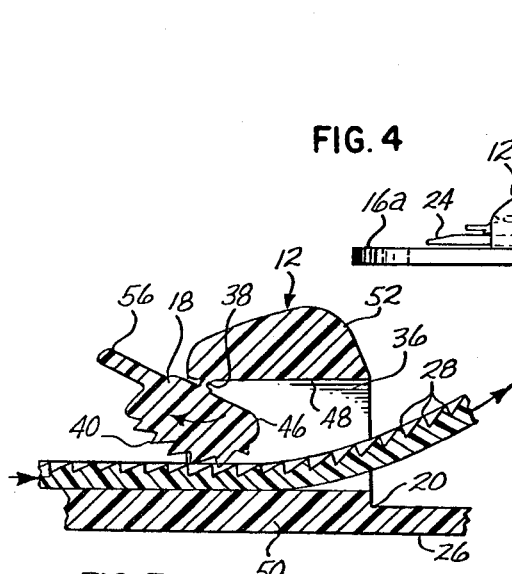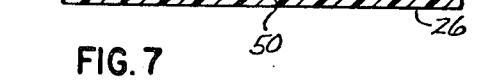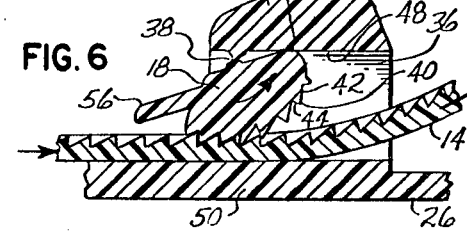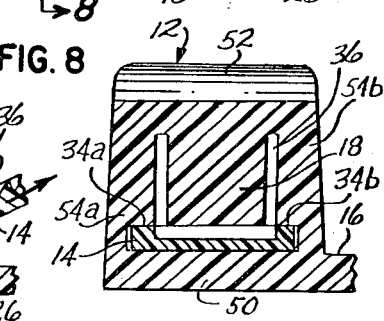

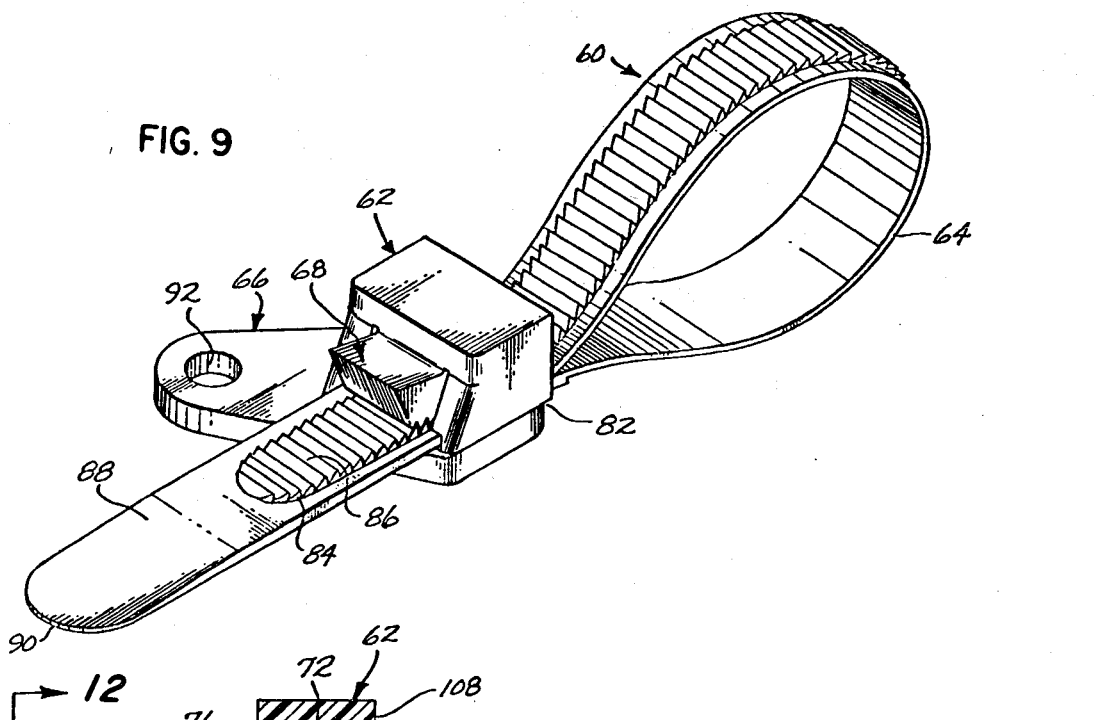
FIG. 9
FIG. 10
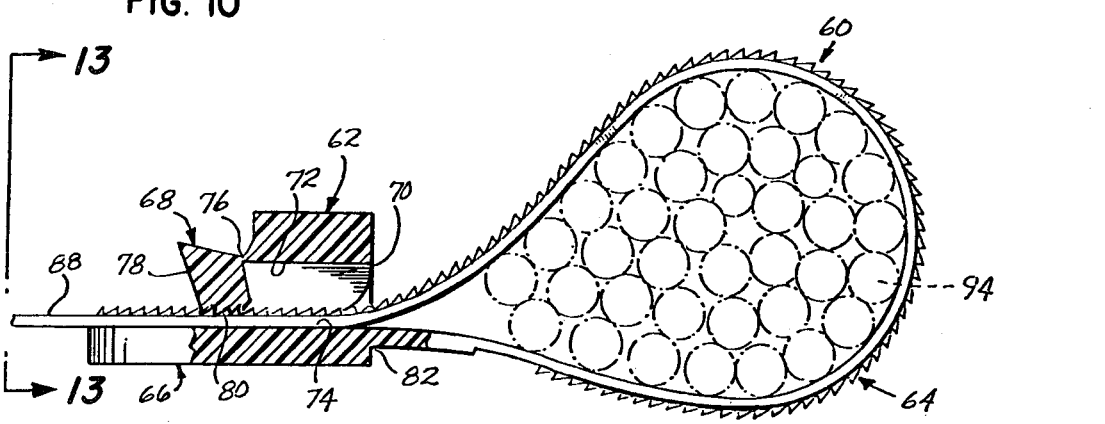
FIG. 11

ADJUSTABLE CLAMP

This is a Continuation-in-Part application of application Ser. No. 781,373, filed Mar. 25, 1977, and now abandonded.

BACKGROUND OF THE INVENTION

Supporting clamps for bundles of wires or hydraulic tubing present a problem in all applications where the bundles are subjected to relative movement due to varying loads, vibration, and large temperature variations. It is important that the clamp hold the bundle tight to prevent wearing of the bundle by the clamp. On installations that require clamps for an almost infinite variation of bundle sizes it requires several different sizes of constant diameter clamps, and even then a single clamp diameter will require and range of resilient shims to cover a range of sizes of bundles.

It is known to use a one-piece clamp with a flexible strap that goes around a bundle and is inserted into a head to give an adjustable bundling tie with the strap locked to the head by a set of matching teeth on the strap and in the head.

U.S. Pat. No. 3,887,965 to Jerome T. Schuplin, U.S. Pat. No. 3,049,771 to Walter J. Litwin et al, and U.S. Pat. No. 3,214,808 to Walter J. Litwin, each show such a bundling tie. When a bundling tie is used as a clamp to support bundles under a heavy load, the flexible clamp can present a problem.

SUMMARY OF THE INVENTION

An adjustable one-piece clamp has a head with an aperture extending from side to side. A flexible strap having laterally extending teeth along one side extends out from the head and loops back to be inserted into the opening in the head. A pivotable member extends into the aperture, is rotated by the entry of the strap and has laterally extending teeth to mate with the strap, then become wedged to prevent loosening of the strap under a load.

It is an object of this invention to provide an adjustable flexible clamp that will hold under a load.

It is another object of this invention to provide a means for releasing a tightened flexible clamp.

DESCRIPTION OF THE DRAWINGS

FIG. 1 shows a plan view of the adjustable clamp of this invention.

FIG. 2 is a perspective view partly in section of the clamp of FIG. 1.

FIG. 3 shows a side view partly in section of the clamp holding a bundle of wires.

FIG. 4 is a side view of a different embodiment of the invention.

FIG. 5 shows an enlarged side elevation sectional and fragmented view of the head area of the clamp as in FIG. 3.

FIG. 6 shows the view of FIG. 5 with the clamp sustaining a heavy load.

FIG. 7 shows a view as in FIG. 5 with clamp released.

FIG. 8 shows a sectional view taken along line 8—8 of FIG. 5.

FIG. 9 shows a perspective view of another embodiment of the adjustable clamp of this invention.

FIG. 10 shows a side elevational view partially in section of the clamp of FIG. 9 with the strap extended.

FIG. 11 shows a side elevational view partially in section of the clamp of FIG. 9.

DETAILED DESCRIPTION

Figure 12:
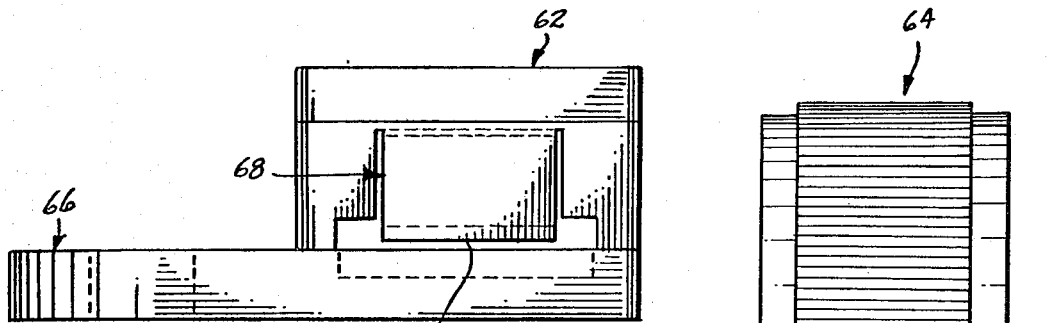
FIG. 12 is an enlarged end view taken along line 12—12 of FIG. 10.
Figure 13:
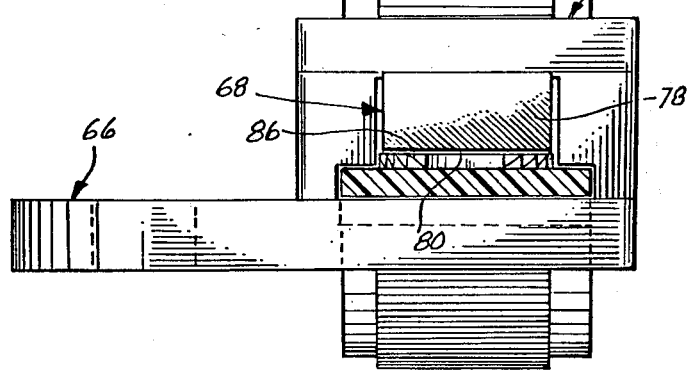
FIG. 13 is an enlarged end view taken along line 13—13 of FIG. 11.

An adjustable flexible clamp 10 has a head 12, a strap 14, a projection 16 as a support, and a pivotable locking member 18. The clamp is of a one-piece construction, with the strap, support projection and its pivotable locking member all integral with the head. The clamp is molded from flexible plastic materials, such as but not limited to, polyethylene or nylon. A preferred material is a DuPont Company nylon named Zytel 105, which has an R-scale Rockwell hardness of about 120. This gives stiffness in areas such as the head, the support member and the pivotable member, while allowing flexibility of the strap and the attachment area of the pivotable member. One end 20 of the strap is integrally joined to the head and the other or free end 22 is preferably tapered as shown at 24. One side 26 of the strap has a eseries of laterally extending teeth 28. The teeth as best shown in FIGS. 5 through 7 are slanted on one side 30, are vertical on the other side 32, and preferably do not extend completely across the strap, but have an area 34a and 34b along the sides that are flat. The teeth are shown as being recessed, but instead may all extend above the surface. The head 12 has an aperture 36 extending therethrough from side to side and is sized to accept the strap with a sliding fit on three sides and preferably part of the fourth side at 34a and 34b. The pivotable member 18 is integrally attached at 38 to the head, and extends down into and near the end of the aperture in a position to be contacted by the end of the strap when it is inserted into the aperture. The line of attachment is sized to give limited flexibility to permit the member to be rotated or pivoted by forced contact from the strap. The pivotable member has laterally extending teeth 40 having an oblique side 42 and a vertical side 44 and sized to mate with the teeth in the strap to lock the strap to the head. The pivotable member is shaped to wedge at corner 46 to a side 48 of the aperture to limit counterrotation and prevent the strap from being pulled out under load. The base 50, top 52 and sides 54a and 54b of the head and the pivotable member 18 are all of a thickness to resist deformation that would permit the strap to be stripped out backward under a heavy load. A handle 56 integral to the pivotable member extends outside the head and can be used to rotate the pivotable member further to free the teeth from engagement and permit the strap to be moved out backward. The clamp is fastened to a support member, not shown, with the projection 16, which has an opening 58 through which a fastener can enter. This projection is at an oblique angle with respect to the direction of extension of the strap when entered in the aperture to facilitate stacking of clamps.

FIG. 4 shows a variation of the clamp 10a where strap 14a is integrally connected to the head 12a at 90 degrees from the direction of the aperture 36a. In this embodiment the teeth 28a are around the inside of the loop. Another embodiment, not shown, would have the strap connected at 180 degrees from the position shown in FIG. 4, and the teeth on the strap would be outside the loop.

In operation the adjustable flexible clamp 10 would be fastened to a support through hole 58 in the projection 16. The free end 22 of the strap would be wound around a bundle of wires such as the bundle 60 shown in FIG. 3 and the end inserted into the aperture 36. As the strap enters it contacts pivotable member 18 and rotates that member as the strap is tightened. When the strap end is released, the pivotable member engages the teeth in the strap and the bundle is held in position by the member. If the load is heavy, the strap will try to back out, which will counter-rotate the pivotable member and wedge it against the side of the aperture and lock in place. If one wishes to remove or add a wire to the bundle 60, the handle 56 is pulled to rotate the pivotable member out of engagement with the strap.

In another embodiment, as shown in FIG. 9 through 15, adjustable flexible clamp 60 has a head 62, a flexible strap 64, projection 66 and a pivotable locking member 68. This clamp is preferably made from the DuPont Company Zytel 105 nylon and is of a one-piece construction with all members integral with the head. The head has an aperture 70 extending therethrough with the aperture or opening having a top side 72 and a bottom side 74. The pivotable member is integrally joined at 76 along an edge at the top side of the aperture. The pivotable member extends down such that side 78 is adjacent the bottom, preferably at a distance of about 0.020 inches, and the member on the side toward the inlet of the aperture has laterally extending teeth 80. One end 82 of the flexible strap 64 is integrally joined to the head 62. The strap is essentially flat with one side having a narrow, centrally located longitudinally extending raised area 84; which is topped with laterally extending teeth 86. Alternately, the teeth may be recessed within the strap, but in this embodiment it is preferred they be raised. The strap is thinned down at 88 to present a free end with a thin leading edge 90. The flexible clamp may be fastened to a support member, not shown, by use of the projection 66; which has an opening 92 for insertion of a fastener. The projection extends parallel to the bottom side of the aperture at an oblique angle with respect to the aperture and with respect to the direction of extension of an inserted strap to permit stacking the clamps.

Figure 14:
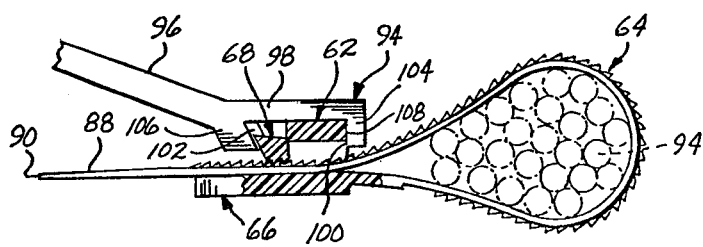
FIG. 14 shows the clamp of FIG. 11 with a positioned unlocking tool.
Figure 15:
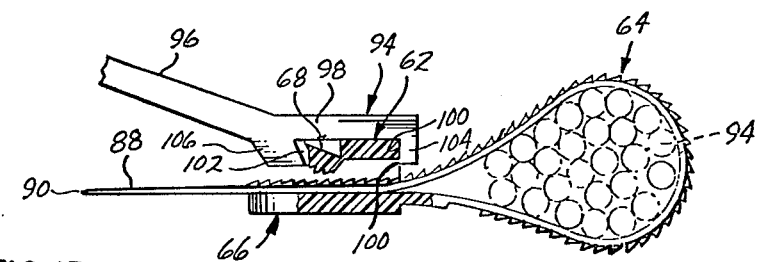
FIG. 15 shows the clamp of FIG. 11 unlocked by the tool.
Figure 16:
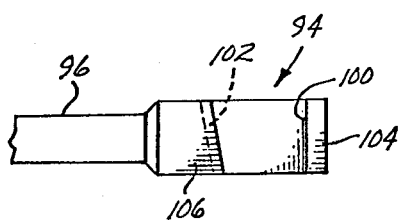
FIG. 16 shows an underside view of the tool shown in FIG. 14 and 15.

In operation the adjustable flexible clamp 60 would be fastened to a support through the hole or opening 92 in the projection 66. The free end 90 of the strap would be wound around a bundle of wires or tubes such as the bundle 94 shown in FIGS. 11, 14 and 15. As the free end of the strap 90 enters and is pressed along the bottom 55 side 74 of the aperture 70 the pivotal member 68 is rotated outward and teeth 80 on the pivotal member engage the teeth 86 of the strap to lock the bundle in place. In the secured position the pivotal member has rotated through a large angle with an angle in excess of 60 degrees perferred. When in this secured position, the engaged teeth are well outside the joined or pivot area 76 to lock against backward pull and subsequent loosening of the strap under load, and the pivotable member is shaped and sized such that the side 78, which was adjacent the bottom side of the aperture prior to inserting the strap, presents an inclined plane extending outward and upward from the inserted strap to provide means for further rotating the pivotable member to disengage the teeth. One may use a finger to press against side 78 and unlock the clamp; however, care must be taken or the pivotable member will be rotated too far and exceed the elastic limit of the material at the joined area. It is preferred to unlock the clamp with the tool 94 shown in FIGS. 14 through 16. The tool has a handle 96, body 98 and a pair of facing surfaces 100 and 102 on respective projections 104 and 106. Surface 100 is flat to fit the back side 108 of the head 62, while facing surface 102 is on an inclined plane in both a longitudinal and a lateral direction. To unlock the clamp, as is shown in FIGS. 14 and 15, the tool is placed against the clamp to span from the head to the inclined plane surface 78 of the pivotable member and the tool moved laterally to rotate the pivotable member and unlock the strap.

I claim:

1. An adjustable clamp for supporting tubing or wiring bundles comprising: a head having an aperture extending therethrough; an elongate flexible strap integrally connected at one end to the head and having laterally extending teeth on one side, said flexible strap to extend around a bundle to be supported and a free end to be inserted into the aperture in the head; a pivotable member integrally connected to an edge of the head at a top outlet side of the aperture, said pivotalbe member to extend with a flat side to be adjacent the bottom side of the aperture to be pivoted outward by the inserted strap and engage the laterally extending strap teeth with teeth on a second side of the pivotable member to lock in the strap to prevent counter pivoting in response to a load; and a projection integral to the head having an opening to accept a fastener to permit mounting the clamp to a support structure.

2. An adjustable clamp as in claim 1 wherein the projection extends at an oblique angle with respect to the direction of and parallel to the bottom side of the aperture.

3. An adjustable clamp as in claim 1 wherein the teeth on the strap are on the side of the strap away from a bundle being fastened.

4. An adjustable clamp as in claim 1 wherein the pivotable member is shaped and sized such that the flat side of the member adjacent to the bottom side of the aperture before insertion of the strap presents an inclined plane to extend outward and upward from the inserted strap to provide a means for further pivoting of the member to disengage the teeth and permit removal of the strap.

5. An adjustable clamp as in claim 10 further comprising in combination and hand tool having means for extending from the head to the inclined plane on the pivotable member and means to control the amount of further pivoting of the pivotable member as the hand tool moves laterally with respect to the strap.

6. An adjustable clamp as in claim 10 wherein the projection on the head extends at an oblique angle with respect to the direction of extension of the inserted strap and parallel to the bottom side of the aperture.

7. An adjustable clamp as in claim 12 wherein the teeth on the strap are on the side of the strap away from the bundle fastened.

8. An adjustable clamp as in claim 12 further comprising in combination a hand tool having means for extending from the head to the inclined plane on the pivotable member and means to control the amount of further pivoting of the pivotable member as the hand tool moves laterally with respect to the strap.

9. An adjustable clamp for supporting tubing or wiring bundles comprising: a head having an aperture extending therethrough; and elongate flexible strap integrally connected at one end to the head and having laterally extending teeth on one side, said flexible strap to extend around a bundle to be supported and a free end to be inserted into the aperture in the head; a pivotable member integrally joined to an edge of the head at a top side outlet end of the aperture, said pivotable member to extend with a flat side to be adjacent the bottom side of the aperture and a side toward the inlet of the aperture having laterally extending teeth and the member to be pivoted outward by the inserted strap and engage the laterally extending strap teeth with the teeth on the pivotable member to lock in the strap to prevent counter pivoting in response to a load; and a projection integral to the head having an opening to accept a fastener to permit mounting the clamp to a support structure.

10. An adjustable clamp as in claim 9 wherein the pivotable member rotation due to insertion of the strap moves the member through a large angle to present the flat side of the pivotable member on an inclined plane to extend outward and upward from the inserted strap at a large angle to provide a means for further pivoting of the member to disengage the teeth and permit removal of the strap.

11. An adjustable clamp as in claim 10 wherein the flat side of the pivotable member is at a distance of about 0.020 inches from the bottom of the aperture before insertion of the strap, and the member rotates at least 60 degrees upon insertion of the strap.

12. An adjustable clamp as in claim 9 wherein in the joined position the engaged teeth are outside the joined area of the pivotable member.

13. An adjustable clamp as in claim 10 further comprising in combination a hand tool having means for extending from the head to the inclined plane on the pivotal member and means to control the amount of further pivoting of the pivotable member as the hand tool moves laterally with respect to the strap.

* * * * *